L. B. GLOVER.
Corn Sheller.
No. 4,677.
Patented July 31, 1846.
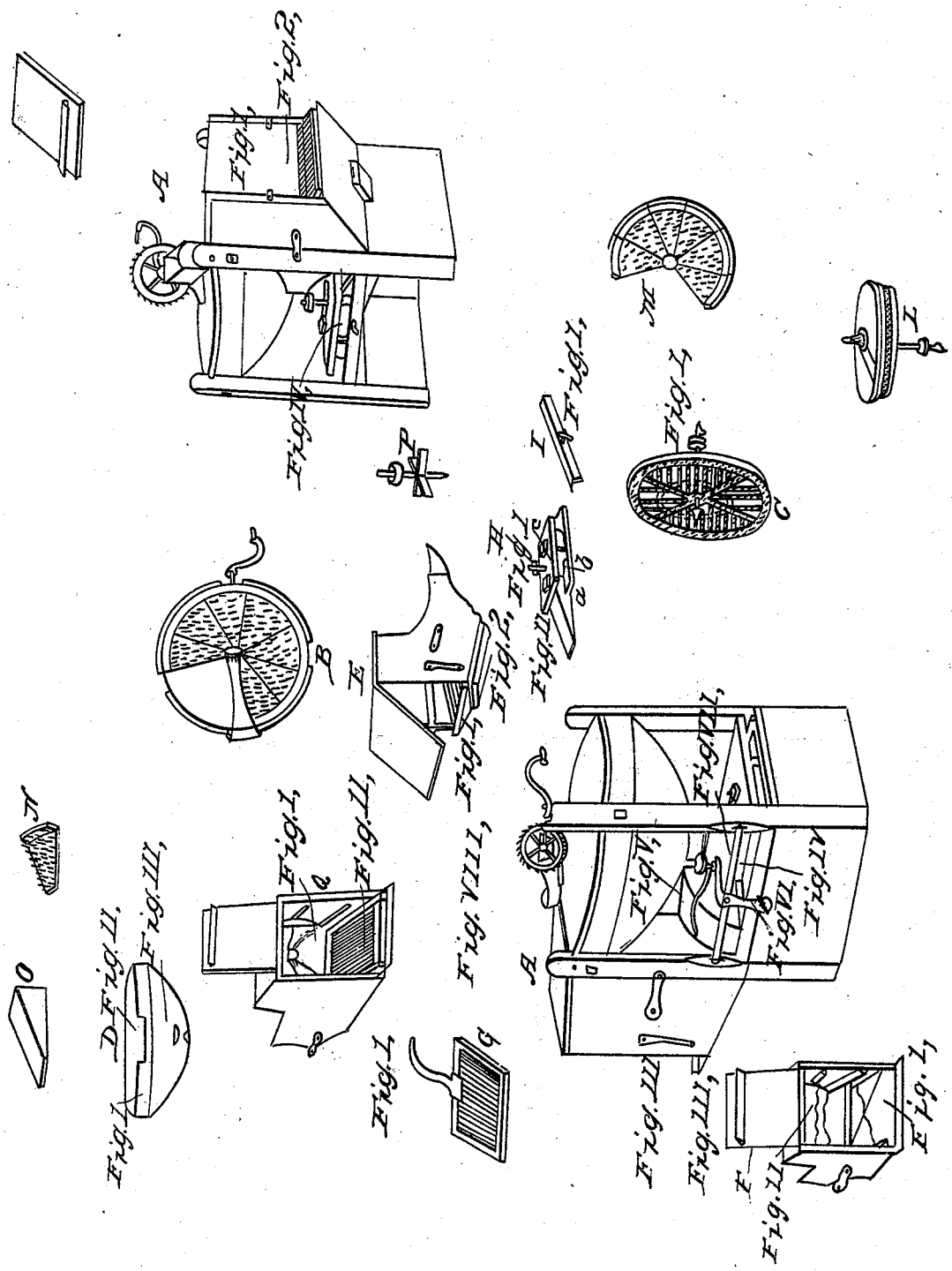

UNITED STATES PATENT OFFICE.

LORENZO B. GLOVER, OF EASTON, CONNECTICUT.

CORN-SHELLER.

Specification of Letters Patent No. 4,677, dated July 31, 1846.

*To all whom it may concern:*

Be it known that I, LORENZO B. GLOVER, of Easton, in the county of Fairfield and State of Connecticut, have invented a new and useful machine for shelling corn and cleaning the same from chaff and other impure materials at the same operation, capable of being worked by hand or other power and to be called "Glover's corn sheller and cleaner"; and I do hereby declare that the following is a full and exact description of its construction and operation.

The nature of my invention consists in providing a corn-sheller that will not only detach the corn from the cob with greater ease and despatch than any other corn-sheller heretofore invented or known, but will also at the same time separate the corn from the cob and otherwise improve materials and present the corn ready for use.

The machine may be constructed of wood iron copper or other proper material and consists mainly of two wheels, the upper one of which is fixed and immovable, the lower one revolving upon a perpendicular axle. These wheels are placed horizontally and parallel to each other as represented in Figure L, and at such distances from each other as will permit the ears of corn to pass between them upon the teeth set upon the adjoining surfaces of the wheels. From the circumference of the upper wheel which is a little larger than the lower one and projects on all sides a little beyond the same in equal proportions, is attached a curb whose sides are perpendicular or at right angles to the surfaces of the wheels and extending from the circumference of the upper wheel to which it is fastened a little below the lower surface of the lower wheel thereby leaving a small space between the circumference of the lower wheel and it so that the corn may pass down the same. To the lower edge of this curb is attached a receiver in the form of a funnel in the bottom of which is an aperture of sufficient size only to permit the axle of the lower wheel to revolve in, and also another aperture of sufficient size to permit the escape or passage of the shelled corn, immediately below the last mentioned aperture is an apron inclined toward the outward side of the machine for the purpose of conducting the corn upon the sieve or riddle which is also somewhat inclined in the same direction as the apron aforesaid. The apron, is merely a conductor of the corn to the riddle, and in the machine forms an inclined plane, made of wood or other material, in such form as to fill the space from the aperture next above it to the riddle next below. So that the corn which passes the aperture is carried down upon the inclined plane upon the riddle, one convenient form adopted in the model, is represented in the drawing Fig. 1, in Q where the riddle is shown, and also in Fig. 11 in F where the riddle is withdrawn for the purpose of showing the receiver below. Through this sieve or riddle the shelled corn and chaff pass into a receiver below, in the bottom of which is also a small aperture about three and a half inches long and about two inches wide in and through which the corn and chaff also passes into another receiver or tube inclined toward the center of the machine which last mentioned tube is open at both ends the upper end outside of the machine and the lower end inside and under the machine, directly underneath the aperture described above as about three and a half inches long and two inches wide is placed a wind-instrument or bellows or blower the mouth of which is immediately at said aperture and within the tube below said aperture and directed toward the upper end of said tube which opens outside of said corn-sheller. This wind-instrument bellows or blower may be constructed in any form and of any proper material that will accomplish the object of blowing a strong current of air through the tube toward the outside of the corn sheller, and is to be arranged on parallel grooves on which A can be moved or removed at pleasure and by means of a thumb screw can be fixed at any desired distance from the aperture through which the corn and chaff enters into the tube, or can be entirely removed from the corn-sheller. This blower when the same is in use is attached to the main axle of the corn-sheller by means of bands or cogs, and receives its motion from the motion of the corn-sheller which will be hereafter described. When this wind-instrument bellows or blower is in operation it sends a strong current of air directly upon the descending stream of corn and chaff by which the chaff is blown directly through the upper end of the tube and without the main machine and while the corn drops down into the bottom of the tube and passes down through the lower end of the same, under the corn sheller.

The ears of corn are introduced into the machine by means of an opening through the upper wheel extending from the circumference of the upper wheel toward the center of the same of sufficient dimensions to permit the ears of corn to pass through the same into the space between the wheels there is also an opening in the side of the curb extending from the lower surface of the upper wheel to the upper surface of the lower wheel and a little in front or before the first mentioned opening and of sufficient size to permit the cobs to pass through the same. There is placed directly over this last mentioned opening a box or inclosure or general receiver extending from the upper surface of the upper wheel down to the sieve or riddle below and underneath the curb and funnel so as to cover the aperture that opens upon the apron that leads to the sieve or riddle inclosed on all sides so as to receive all the corn cobs and chaff that escape through either the aperture in the curb between the wheels, or in the aperture below the wheels on the front side of this box or general receiver and on the two sides next thereto is attached a cleat a few inches above the sieve or riddle for the purpose of concentrating the corn cobs and chaff and throwing the same as nearly as possible upon the center of the sieve or riddle. The outer side of this box or general receiver is attached by means of hinges so that it can be opened and shut at pleasure. There is an opening in this side of the box or general receiver directly above the sieve or riddle of the entire length of the sieve and of sufficient width to permit the cobs to escape without the corn-sheller while the shelled corn and chaff pass down through the sieve or riddle as above described. This sieve or riddle is placed in parallel grooves and is fixed on a pivot in and through the upper side of the same and is made movable by means of an arm extending from the same to cogs or knobs on the axle of the main machine.

The revolving wheel is kept within a proper distance of the upper wheel to accomplish the work in the best manner by means of a spring attached to the parts of the main machine and so arranged that it can be raised or depressed at pleasure by means of a thumb screw, upon which spring the axle of the revolving wheel rests.

The axle of the revolving wheel extends upward through the upper wheel sufficiently far to place a cog wheel on its upper end in which cog wheel another cog wheel attached to another axle with a crank belonging thereto works, when the machine is in motion. The entire motion is communicated to all parts of the machine by means of the crank and axle above described producing the revolution of the axle of the revolving wheel by the contact of the cog wheels as above described.

I will now proceed to describe more particularly the several parts of this corn sheller as represented in the accompanying drawings making also a part of this specification.

A, A, represent two of the external sides of the machine with the wind instrument or bellows or blower attached thereto.

B represents the upper wheel which is fixed immovable in the machine. It has upon three-fourths of its lower surface, as represented in said plate, teeth or rows of teeth set in such form and manner and constructed of such materials and of such size and dimensions as will best separate the corn from the cob. The remaining fourth part of said surface is entirely free from teeth as is represented in said plate by the Fig. 1. There is a rim formed on and attached to the outer side of the throat portion of this wheel only, on which teeth are set, fitting up closely to the curb, and of the same width as the space between the lower wheel and the curb and as thick as the teeth on said surface are long so as to make the acting surface uniform, made to prevent the cobs from clogging up over this space. This rim is represented by the black line around three-fourths of said plate in B, and also in Fig. M, which represents by the black line the position of the rim upon this wheel and the extent of it. It is also further and more clearly represented in a section of this wheel as represented in Fig. N. The rim in this section is marked a, a.

C represents the lower or revolving wheel and may be constructed in various forms either solid or open, and has teeth arranged upon its surface in the same manner and of the same description as above, except they are arranged upon the entire surface of the same instead of three-fourths of the same. This wheel is constructed after the mode of a balance wheel having its outer edge or circumference heavier that the inner portion of the same for the purpose of giving greater power in its revolution. The wheel represented in the plates which is deemed the best form, is an open wheel. It is divided into four sections by two strong bars extending from circumference to circumference, and crossing each other at right angles in the center of the wheel. Each section is formed by extending a bar of sufficient strength and size to sustain the teeth placed upon its surface from the center of the wheel in that section to the center of the circumference in that section and then filling up the same by corresponding parallel bars extending from said circumference to said cross bars and attached to the same as represented in said plate. These bars are placed at such distance from each other as will permit the shelled corn to pass down between them. The teeth are set upon all these bars, and thus, in the revolution of this wheel, they must strike the ear of corn in such directions as will produce a constant revolution of the cob between the wheels. By the time the ear of corn is carried around between the wheels to the point where the teeth seize upon the surface of the upper wheel the cob is left entirely bare of corn, and the increased space produced by the absence of teeth on this upper wheel in this section of it, together with the centrifugal force throws the cob with great force into the general receiver through the aperture in the curb, while the corn passes down between the bars into the funnel below.

C represents the receiver or funnel next below the revolving wheel, with the curb on the upper part of the same represented by Fig. I, with the aperture in the same for the escape of the cobs represented by Fig. II, and also the aperture near the bottom of the receiver for the escape of the shelled corn represented by Fig. III, this curb and receiver with the upper wheel as a cover for the revolving wheel and protect the corn from escaping without the corn-sheller.

E, represents the general receiver, with the door of the same partly open, for the purpose of showing the position of the sieve or riddle in the bottom of the same marked by Fig. I together with the tube represented by Fig. II through the upper end of which the chaff is blown and through the lower end of which the shelled corn passes under the machine. F represents the general receiver also with the door open and the sieve and riddle removed for the purpose of representing the screen under the riddle, marked Fig. I through which the corn escapes into the tube below and also the apron represented by Fig. II and above described on the inside of the door which is turned up as also in Fig. K is represented the cleats for the purpose of throwing the corn on the center of the riddle. When the machine is in operation this door is closed as represented in plate A, Fig. I, with the aperture as represented by Fig. II, for the escape of the cobs.

G represents the sieve which is made of strong wires or bars of iron or other material running across the same in one direction only, as represented on the plate, then wires where the sieve or riddle is placed in the machine stand endwise or at right angles to the base of the apron as represented in Fig. II plate Q and parallel with the sides of the general receiver as represented in plate E, Fig. I, and the bars or wires should be a sufficient distance from each other only, for the easy escape of the corn below. Fig. I, in plate F represents the arm of the sieve or riddle which extends to the main axle of the wheel and by coming in contact there, with an irregular knob or cog wheel gives motion to the sieve or riddle, which motion is regulated and kept up by means of another spring placed on the outside of the general receiver and reaching within the sieve as represented in plate A Fig. III. The knob or cog wheel which moves the arm is represented on the lower end of the axle of the revolving wheel as seen in plate C Fig. I.

K, represents the wind instrument or blower and is formed by means of arms or wings extending from that part of the axle Fig. I. Inclosed within the sides of the blower marked $a$, $b$, $c$. Then arms or wings are formed by means of the flat pieces of wood or other material passing through the axle of the blower at right angles to each other of such size and form as the blower may require. These arms are firmly attached to said axle by the revolution of which the current of air is produced from the blower. These wings or arms are represented in Plate P in the drawings.

Fig. II represents the pipe of the blower, the mouth of which is placed immediately underneath the aperture that leads from the receiver under the sieve or riddle into the tube below. The pipe is a new conductor of the current of air from the blower and may be formed of wood or other material of such form and dimensions as the blowers may require. This pipe or conductor is represented by Plate O, and also in its connection with the main machine in Plates A, A, Fig. IV. I represents one of the grooves in which the blower is moved and removed, and Fig. I, the thumbscrew which regulates the same. The spring on which the lower end of the axle of the machine rests and revolves is represented in plate A, Fig. V. The thumbscrew which regulates it is represented by Fig. VI in the same plate.

Fig. VII represents the rod which revolves in the parts of the machine; the spring which sustains the main axle of the machine passes over this rod and is firmly attached to it so that when this spring is elevated or depressed by the action of the thumb screw this rod forms the axis upon which the spring in part revolves.

Fig. VIII represents the crank which communicates by means of its axle with the cog wheel on the end of the axle of the revolving wheel by which motion is communicated to the corn-sheller.

What I claim and desire to secure by Letters Patent is—

1. The open wheel constructed as above described.

2. The arrangement of the bars and teeth upon the revolving wheel by which the revolution of the cob is produced.

3. The arrangement of the teeth upon the lower surface of the upper wheel by which the cob is permitted to escape from between the wheels when the corn has been disengaged from it.

LORENZO B. GLOVER.

Witnesses:
EZRA W. KEELER,
JAMES O. LOOMIS.